(12) United States Patent
Hedenberg

(10) Patent No.: US 6,398,243 B1
(45) Date of Patent: Jun. 4, 2002

(54) DIRECT ACTING AIR SUSPENSION SYSTEM

(75) Inventor: William E. Hedenberg, Elizabethtown, KY (US)

(73) Assignee: Link Mfg Ltd., Sioux Center, IA (US)

( * ) Notice: Subject to any disclaimer, the term of this patent is extended or adjusted under 35 U.S.C. 154(b) by 0 days.

(21) Appl. No.: 09/365,536

(22) Filed: Aug. 2, 1999

Related U.S. Application Data
(60) Provisional application No. 60/096,476, filed on Aug. 14, 1998.

(51) Int. Cl.$^7$ ................................................ B60G 11/34
(52) U.S. Cl. ................................... 280/124.163; 267/31
(58) Field of Search .................... 280/124.157, 124.162, 280/124.163, 124.17, 124.174, 124.175, 124.153, 124.128; 267/31, 32, 122; 188/195

(56) References Cited

U.S. PATENT DOCUMENTS

| | | | |
|---|---|---|---|
| 3,233,915 A | * | 2/1966 | Hamlet ..................... 280/6.159 |
| 3,531,099 A | * | 9/1970 | King .......................... 267/186 |
| 3,970,293 A | | 7/1976 | Sweet et al. |
| 4,397,478 A | * | 8/1983 | Jensen et al. ............. 280/6.159 |
| 5,024,462 A | * | 6/1991 | Assh ........................... 280/680 |
| 5,351,986 A | | 10/1994 | Hedenberg et al. |
| 5,632,471 A | * | 5/1997 | Pradel ....................... 267/64.11 |
| 5,697,635 A | | 12/1997 | Koster et al. |
| 5,938,221 A | * | 8/1999 | Wilson ................. 280/124.163 |
| 6,129,369 A | * | 10/2000 | Dudding .............. 280/124.175 |

* cited by examiner

*Primary Examiner*—Eric Culbreth
*Assistant Examiner*—David R. Dunn
(74) *Attorney, Agent, or Firm*—Thomte, Mazour & Niebergall; Dennis L. Thomte

(57) ABSTRACT

An air suspension system mountable on the axle of a vehicle such as a pick-up truck. The suspension system includes an air spring, a pusher torque rod and a lever arm. The torque rod has one end pivotably affixed to the chassis and its other end affixed to the axle housing to control movement of the axle housing in an arcuate path. The lever arm has an end pivotably affixed to the chassis and its other shiftably and slidably supported on an axle bracket. The air spring is mounted on the lever arm to provide load support to the chassis. The shock absorbers for the vehicle are controlled from the same air pressure source as the air spring.

3 Claims, 5 Drawing Sheets

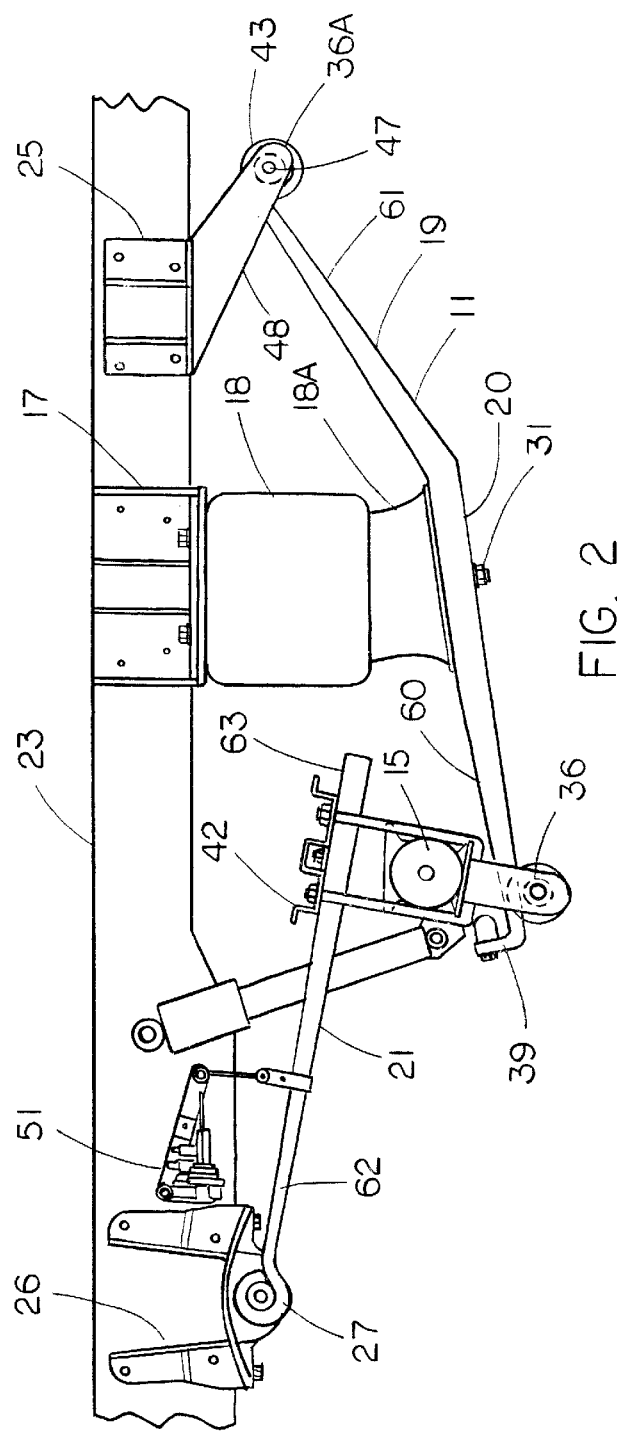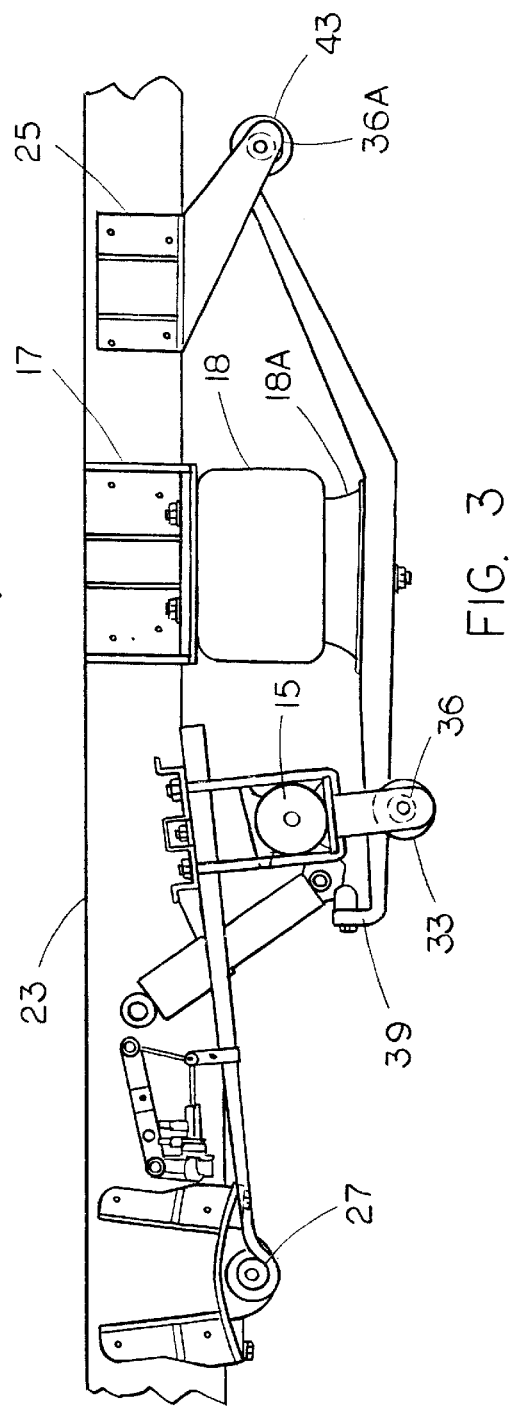

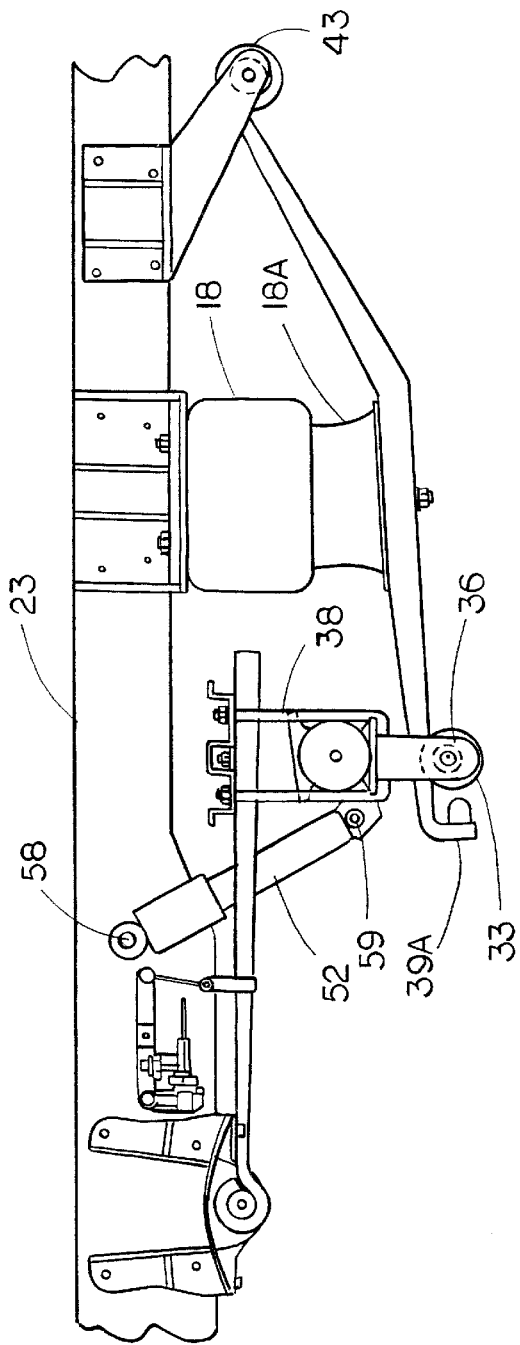
FIG. 4
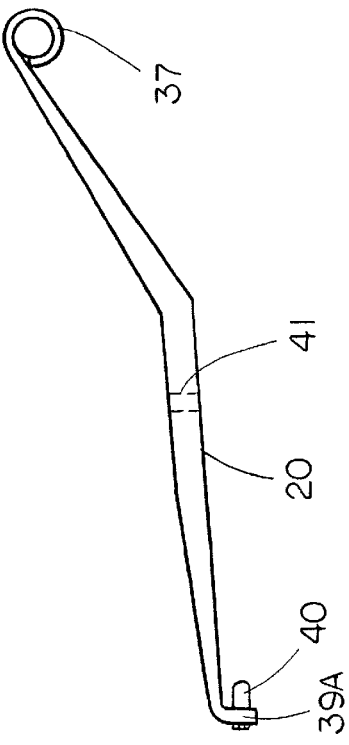
FIG. 6
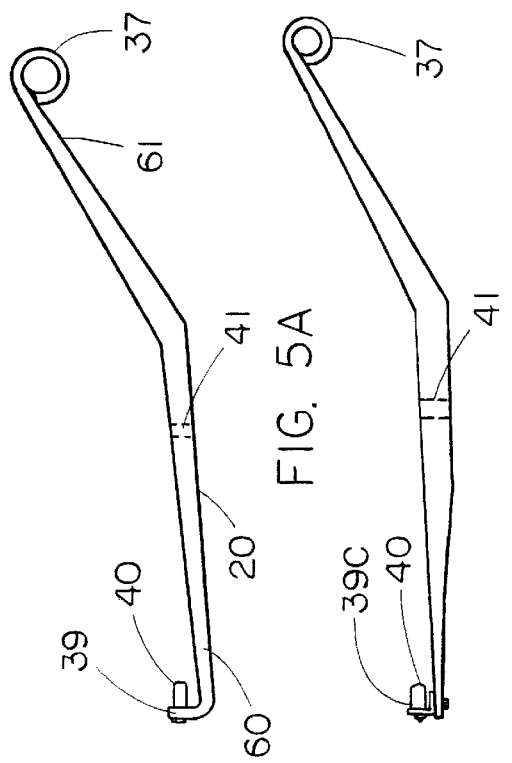
FIG. 5A
FIG. 5B

DIRECT ACTING AIR SUSPENSION SYSTEM

The present application claims the priority date of U.S. Provisional Patent Application Serial No. 60/096,476 filed on Aug. 14, 1998 in the name of William E. Hedenberg.

BACKGROUND OF INVENTION

This application is an improvement over U.S. Pat. No. 5,351,986 issued to William E. Hedenberg et al which relates to air suspension systems applicable to and useful for vehicles, particularly for pick-up trucks, recreational vehicles (RVS) and vans. U.S. Pat. No. 5,351,986 is incorporated herein by reference.

A present trend in the development of load carrying vehicles is to provide a vehicle with an empty weight as low as possible and a load carrying capacity as large as possible. In an empty state the damping is often too high (too hard) and in the loaded state the damping is often too low (too soft). The inventor has found that an answer to this problem of load dampening sensitivity is the use of an air suspension system wherein the axle frequency of vibration of about 1.16 to 1.25 Hz remains unchanged throughout the entire load range.

Another patent of interest to the present invention is U.S. Pat. No. 5,697,635 issued to Koster et. al which discloses a pneumatic suspension assembly for vehicles wherein an air suspension system and the shock absorbers are supplied by the same air supply and are electronically controlled. The shock absorbers are also electronically controlled independently of the air spring to provide damping during critical driving conditions. The present invention, provides a simplified system wherein the air springs and the damping forces of the shock absorbers automatically adjust to the varied load conditions. The shock absorbers are initially selected or tuned for vehicles of different load ranges.

SUMMARY OF THE INVENTION

This invention relates to an improved air suspension system for the rear axle of a vehicle such as a pick-up truck wherein an air spring is mounted directly on a lever arm and the air spring and lever arm support the weight of the vehicle frame and load. In one embodiment, the lever arm has its forward end supported on a roller bushing of a bracket assembly mounted on the axle housing. The bushing provides a rolling and shifting action for the lever arm. The rear end of the lever arm is affixed to a frame bracket mounted on the vehicle chassis. The system further employs adjustable hydraulic shock absorbers pneumatically controlled by the same source of compressed air that supplies the air spring.

The foregoing features and advantages of the present invention will be apparent from the following more particular description of the invention. The accompanying drawings, listed hereinbelow, are useful in explaining the invention.

DRAWINGS

FIG. 2 shows a relatively enlarged side view of the system of FIG. 1 depicting the operation of the system when the axle is in a jounce or down position;

FIG. 3 is a view similar to FIG. 2 depicting the operation of the system when the axle is in a full rebound position;

FIG. 4 shows a second embodiment of the lever arm in a relatively normal ride height, and also more clearly shows a mounting a shock absorber;

FIGS. 5(A and B) shows the lever arm with two bumper stop configurations;

FIG. 6 shows a view of another embodiment of the lever arm;

DESCRIPTION OF INVENTION

Figure 1:
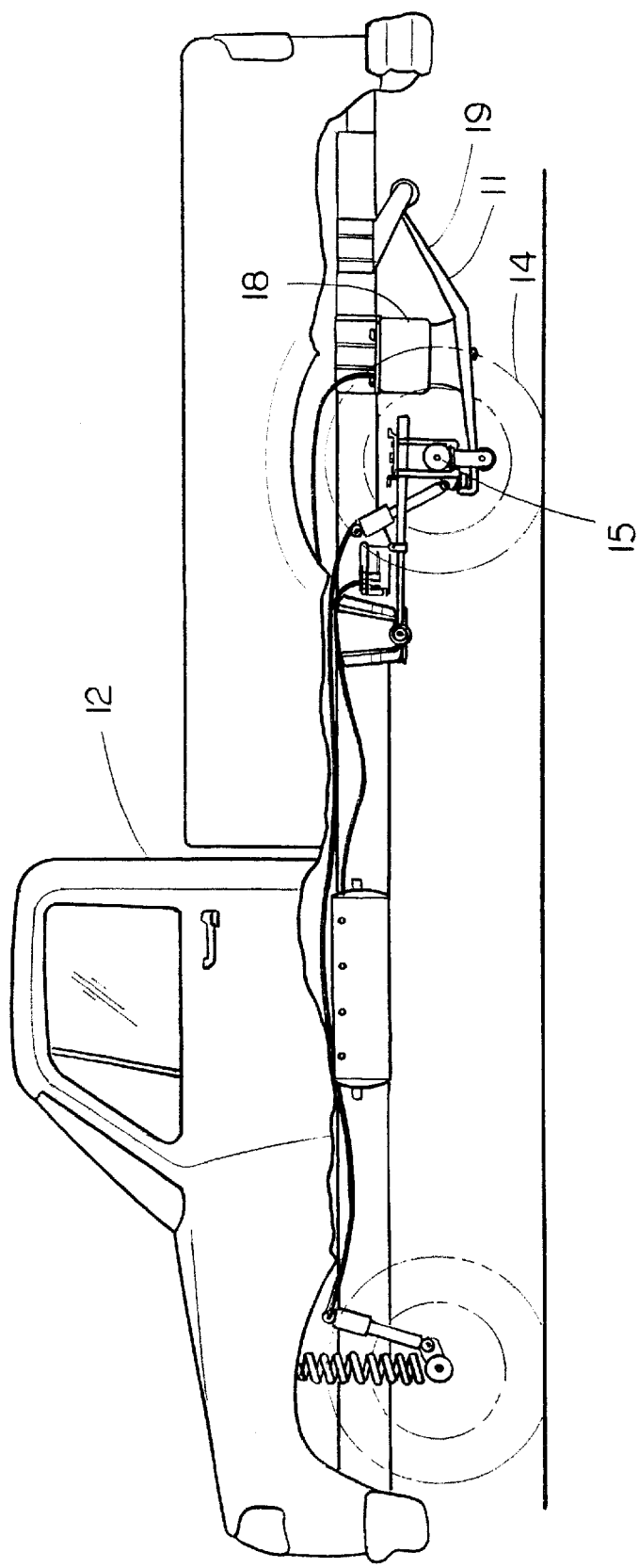
FIG. 1 shows a side view of a vehicle (a pick-up truck) with one embodiment of the inventive air suspension system installed thereon.

FIG. 1 shows an air suspension system 11, installed on a vehicle such as a pick-up truck 12. The air suspension system 11 is shown, as installed adjacent the left rear wheel 14 on the rear axle housing 15 for axle 15A of the truck 12. It will, of course, be understood that a similar suspension structure which comprises the other side or part of the system is installed adjacent the right rear wheel on the rear axle housing 15 of the truck.

Refer now also to FIGS. 2 and 3, the air spring 18 for the system 11 may comprise a vehicle air spring (bag) of any suitable known type, and is selected dependent on the load range of the vehicle. The air spring 18 is mounted on a lever arm 19 which extends longitudinal of the vehicle and transverse to the rear axle housing 15. In the preferred embodiments, lever arm 19 comprises a solid beam of formed spring steel. Lever arm 19 may also comprise one or more leaf springs of spring steel. A suitable bracket 17 affixes the air spring 18 to the vehicle chassis or frame 23. The air spring directly supports the chassis 23.

The air suspension system 11 of the present invention provides the advantages and features of the invention of U.S. Pat. No. 5,351,586. Further, the present invention improves the lever arm assembly of U.S. Pat. No. 5,351,586. The present system also includes pneumatically controlled hydraulic shock absorbers, that are connected to be controlled from the same air supply as the air spring; this will be explained with relation to FIG. 9. The air springs operating in conjunction with the hydraulic shock absorbers provide more sensitive control and better dampening response to change load conditions.

Figure 7:
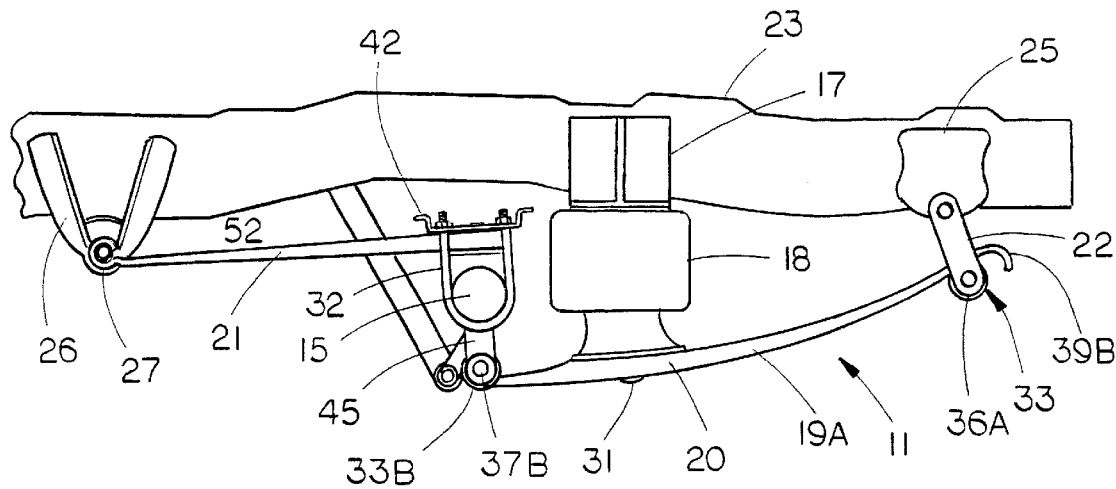
FIG. 7 shows another embodiment of the system wherein the rear end of the lever arm is positioned to shift.

Refer now also to FIGS. 4 and 7 which are relatively enlarged views of the basic system 11 of FIG. 1, to more clearly show the system. (FIGS. 4 and 7 include minor bracket variations from the systems of FIGS. 2 and 3). The system 11 is installed in what is termed a trailing lever arm position; that is, the air suspension spring 18 is directly mounted on a lever arm 19 which itself is mounted to extend rearward of the axle housing 15 (that is rearward relative to the longitudinal orientation of the vehicle). The lever arm 19 includes a center section 20 a forward end 60 and a rear end 61. Section 20 provides a support area for the air spring 18 at a location rearward of the rear axle housing 15.

A torque rod or arm 21 extends forward of the rear axle housing 15. Torque rod 21 may also be of spring steel and, in one embodiment, is tapered from a relatively broad or thick configuration at its axle end to a reduced thickness at its forward end. This reduces the weight of the rod 21 while not reducing its effectiveness. The forward end 62 (relative to the longitudinal axis of the vehicle) of torque rod 21 is pivotally mounted by a suitable bracket assembly 26 and bushing 27 to the chassis 23. The after or rear end 63 of torque rod 21 is mounted to the axle housing 15 by a suitable bracket assembly 38 including U-shaped bolt 32 and associated plate and fasteners 42. In operation, the axle housing 15 moves in an arcuate path determined by torque rod 21 which pivots about bushing 27 mounted on bracket assembly 26.

The torque rod 21 provides a rearward and downward vector of force on the rear of the vehicle chassis when the vehicle brakes are applied to tend to maintain the vehicle level during braking. Also, rod 21 provides a forward and upward vector on the rear of the vehicle chassis when the vehicle is accelerated and tends to maintain the vehicle level during acceleration.

As shown in the drawings, the after or rear end 63 of torque rod 21 is preferably positioned above the axle housing 15; this provides more road clearance for the assembly. Torque rod 21 could be positioned at a point adjacent to, or beneath, the axle but the road clearance would, of course, be less.

The lever arm 19 may be formed to have a slight bend as clearly shown in FIGS. 1–6, or it may be curved in a parabolic-like configuration as shown in FIG. 7. In the embodiment of FIGS. 1–6 a bend (L-bend) or stop 39 is formed on the forward or front end 60 of lever arm 19, and a eye or loop 37 is formed at the rear or after end 61 of lever arm 19, see FIGS. 5 and 6. The purpose of the stop 39 will be explained hereinbelow. In the various Figures, the stops are designated collectively as 39; stop 39A, the downwardly depending stop of FIG. 6; stop 39B, the downwardly depending stop of FIG. 7; and stop 39C, the plate of FIG. 5B.

In FIG. 5B the stop 39A comprises a plate bolted onto the end of the lever arm 19 rather than a bend on the lever arm itself. In FIGS. 1, 2, 3 and 5, the engaging end of bend or stop 39 of lever arm 19 is shown as extending upwardly from the body of lever arm 19.

An advantage of the upwardly extending end is that this provides more or better road clearance. Also, it has been found that an upwardly extending stop 39 distributes axle jounce forces to the axle rather than to the lower axle bracket 33. In the jounce mode, the downward extension of the stop 39A tends to engage the bushing 36 and places additional forces on the lower part of the axle bracket 33. In an embodiment where road clearance is not a factor and jounce force considerations are less of a factor, the embodiment of FIGS. 4 and 6 with a downward bend or stop may be used.

The section 20, of the lever arm 19 on which the air spring 18 is supported or located, may be made somewhat thicker material. The eye or loop 37 at the rear end of lever arm 19 is pressed into the bushing 36 of fixed rear pivot bracket 43 for the lever arm. The pivot bracket 43 for mounting the eye or loop 37 of lever arm 19, as shown in FIGS. 1–6 may be similar to lower axle bracket 33, to be explained below, and includes a suitable roller bushing 36, mounted on a pin 47 extending between two spaced plates 45. A rear hanger bracket 25 mounts the fixed lever arm pivot assembly bracket 43 to the chassis.

Figure 8:
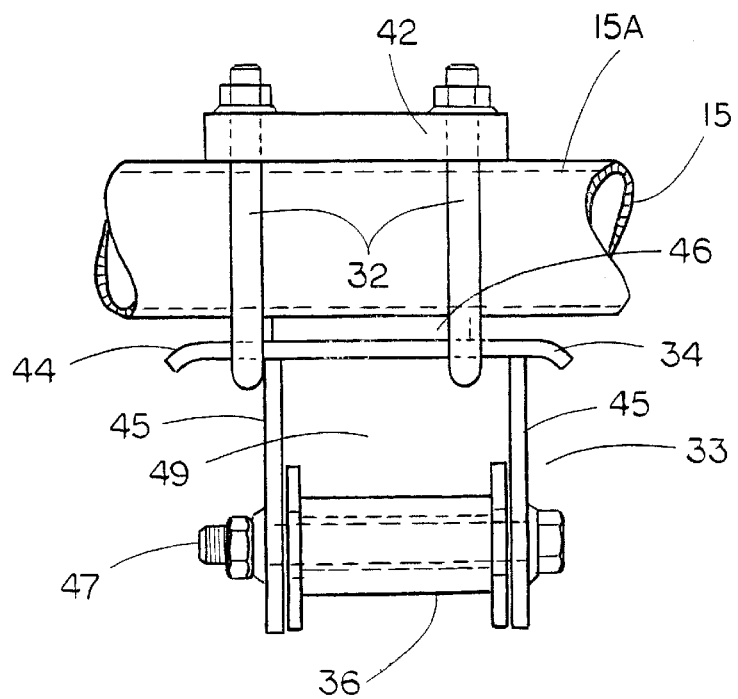
FIG. 8 shows an end view of the axle bracket assembly for supporting the shifting end of the lever arm.

The lower axle bracket 33 for mounting the shifting end of lever arm 19 is shown in relatively enlarged view in FIG. 8. Lower axle bracket 33 includes U-bolts 32, an inverted U-shaped bracket 34 having a top plate 44 and downwardly depending spaced side plates 45, mounting pin 47 and roller bushing 36. An axle alignment plate 46 is mounted between top plate 44 and axle housing 15. Bracket 34 is retained in position by U-bolts 32 on axle housing 15. The spaced side plates 45 receive pin 47 which retains a round roller bushing 36. A spacing 49 is formed between roller bushing 36, top plate 44 and side plates 45. The lever arm 19 is mounted in spacing 49 and supported on bushing 36, see FIGS. 2 and 3.

Refer now also to FIGS. 4 and 8. When the lever arm 19 is placed into position for mounting, and bushing 36 and mounting pin 47 are placed within plates 45, the lever arm 19 will rest on, or be supported, for shifting movement on roller bushing 36. The height of the bend 39 is designed to be larger or greater then the height of the spacing 49 formed between bushing 36 and the top plate 44 of lower axle bracket 33. The upper surface of lever arm 19 will hit or abut plate 44 before the free end of the bend 39 can move out of engagement with the bushing 36. In effect, the lower axle bracket 33 forms a confining cradle or cage for supporting a shifting and rolling movement of lever arm 19 on roller bushing 36. In FIGS. 1–3 and 5 the bend extends upwardly to provide maximum road clearance. The embodiment of FIGS. 5 and 6 shows the bend 39A depending downward; this embodiment may be used when road clearance is not a factor.

Refer now to FIGS. 2 and 3, the eye or loop 37 of lever arm 19 is pressed into bushing 36A of pivot assembly bracket 43 for lever arm 19. That is, the bracket 43 pivotably supports the rear end of lever arm 19 to move in an arc-like path. As mentioned above, rear pivot assembly bracket 43 is generally similar to lower axle bracket 33, and includes hanger plates 48 extending from bracket 25 for holding pin 47 on which bushing 36 is mounted. Eye 37, is thus mounted on bushing 36 and enables lever arm 19 to pivot in an arc.

While the embodiments shown in FIGS. 1–6 show a lever arm 19 having upwardly extending and downwardly depending stops 39 and 39A, the stops could for example, comprise ears extending outwardly. The basic premise is that the lever arm 19 is retained in shifting or shiftable (capable of being shifted or) support relation with lower axle bracket 33, and that the lever arm 19 is cradled and constrained from falling out of bracket 33.

In the embodiments of FIGS. 1–6, a bumper or cushion 40 is mounted on the contacting or engaging side of bend 39. This tends to cushion the contact between the bend 19 and the surface which it engages.

Refer again to FIGS. 2 and 3. As discussed above, the lever arm 19 is shiftably (moves in a shifting manner)

supported on roller bushing 36; that is the lever arm 19 shifts on roller bushing 36 (bushing 36 may be said to function as a load bearing idler roller). In the embodiment shown, lever arm 19 pivots in an arc resulting in about a three inch shift or excursion on roller bushing 36. In operation, assume the wheel 14 hits a bump and the axle housing 15 moves up, see FIG. 3. The base 18A of the air spring is caused to move up (be forced up) in the air spring bag. The shifting movement of the lever arm 19 enables the base 18A to move up in a relatively more vertical direction in line with the air spring bag. This movement enables the base (piston) 18A of the air spring 18 to absorb the bump shock in a truer or straighter line orientation to provide a smoother ride. In addition this feature extends the life of the air spring.

FIG. 2 shows an example of the maximal downward (jounce) movement of the axle housing 15, as caused by a sudden drop of the associated wheel of the vehicle into a pothole. As the axle goes downward, the forward end of the lever arm 19 shifts over the rolling surface of bushing 36. Note that the rear pivot assembly bracket 43 retains the rear end of lever arm 19 in position as the lever arm 19 moves (pivots) downward in an arc. The air spring base 18A moves in a like manner. As the axle moves down to a full jounce position, the bend 39 and the bumper 40 of the lever arm 19 engages the upper part of the lower axle bracket 33 at the axle housing 15 and arrests movement of the lever arm 19, and of the entire suspension system. This prevents maximal extension of the air spring 18 and of the shock absorber 52; maximal extension, could damage both components.

The friction between lever arm 19 and the bushing 36 is minimized by the shifting and rolling movement between the two components. In actual operation, as the axle moves up and down, the lever arm 19 pivots in an arcuate path on pivot assembly bracket 43. In operation, the forward end of lever arm 19 is continuously shifting on roller bushing 36. FIGS. 2 and 3 depict that lever arm 19 shifts a limit of about three inches on roller bushing 36. The shifting and rolling movement reduces friction and lowers the axle frequency which in turn results in a smoother ride.

The torque rod 21 pivots on bushing 27 of bracket 26. Axle housing 15 is rigidly affixed to the rear end 63 of torque rod 21 and pivots in an arcuate path defined by the movement of the rear end of torque rod 21; that is, the torque rod 21 defines the arcuate path of rear axle housing 15. As the axle housing 15 moves in its arcuate path the lever arm 19 shifts on roller bushing 36, the lever arm provides some "give" to the movement of the axle housing 15 and does not constrain the movement of the rear axle housing.

Thus as can be seen from FIGS. 2 and 3, the axle housing 15 moves intermediate two pivot bushing 27 and 36A. The forward pivoting lever, torque rod 21, is rigidly affixed to the axle housing 15; the rear pivoting lever, lever arm 19, is supported in a shifting (flexible) manner to the axle housing 15. As alluded to above, the lever arm 19 which supports the chassis load, through air spring 18, also travels in an arcuate path about its pivot point, but it provides "give" for the arcuate path movement of the axle housing. (Note the contrast with U.S. Pat. No. 5,351,986 cited above, wherein the two ends of the lever arm and the two ends of the torques rod are secured to respective pivot points). In the present invention, the forward and rear pivoting assemblies, the torque rod 21 and lever arm 19 complement each other to provide controlled movement to the rear axle housing 15. This construction and assembly have been found to provide a much smoother and controlled ride as compared to the prior art. Note that the precise geometric relations of the movement of the axle housing 15 relative to the lever arm 19, the torque rod 21, the air spring 18, and the shock absorbers 52 have not been fully analyzed mathematically.

The relatively freer action of the load bearing point of lever arm 19 on bushing 36 of lower axle bracket 33 tends to make the lever arm 19 a self-centering arm; that is, the weight distribution of the load tends to remain directly beneath the axle housing 15. Since the weight distribution of the load is effective beneath the axle this lowers the center of gravity of the overall load, which enables the vehicle to "hug" the road better.

In the embodiment of the inventive air suspension system shown in FIG. 7, the ends of lever arm 19A are effectively reversed. In FIG. 7, the shifting and rolling action for the lever arm 19A is provided by a fixed axle assembly 33A to the rear or after end of the lever arm 19A; and, the pivoting end of the lever arm 19A is the forward end of the lever arm which is mounted to the axle housing 15. In the embodiment of FIG. 7, side plates 22 affixed to a rear frame bracket 25 support fixed shackle assembly 33A. The stop 39B depends downwardly. The fixed axle assembly 33A is generally similar to lower axle bracket 33 and includes a roller bushing 36A to provide a shifting and rolling support surface for the lever arm 19A.

Likewise the lower axle bracket 33B for affixing the forward end of lever arm 19A to the rear axle as shown in FIG. 7, can be generally similar to lower axle bracket 33 used in FIGS. 1–4; the difference in function is that the eye 37B at the forward end of lever arm 19A is mounted on the roller bushing of lower axle bracket 33B for providing a pivoting action.

Road tests on pickup trucks with both of the embodiments of FIGS. 1–4 and FIG. 7 establish that the inventive system provides a smooth ride, with good steering control, and good braking and acceleration features under various load conditions, from empty to full load,. The embodiment of FIGS. 1–4, the front end shifting lever arm embodiment, appears to provide a slightly smoother ride for a wide range of loads for pickup trucks rated in the mid load range.

Figure 9:
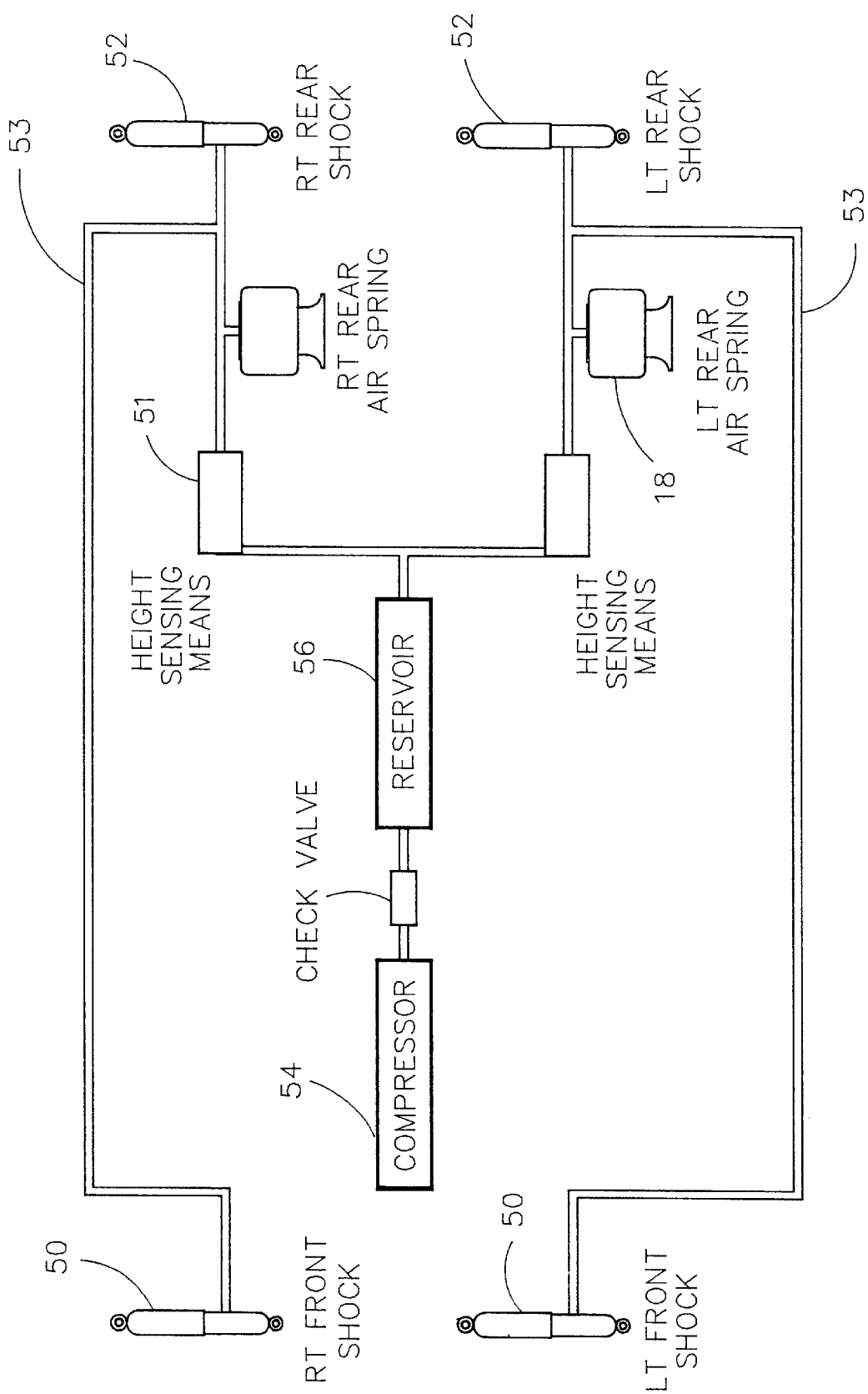
FIG. 9 is a diagram of the air supply control system for the air spring and for the hydraulic shock absorbers.

FIG. 9 shows hydraulic front shock absorbers 50 and hydraulic rear shock absorbers 52, are automatically adjustable in proportion to the adjustment of the air springs, based on the vehicle load, to provide desired damping characteristics. The shock absorbers are pneumatically controlled by the same source of air pressure which supplies the air spring. Front shock absorbers 50 are the same and adjusted for one load or weight size, and rear shock absorbers 52 are the same and normally adjusted for different heavier load or weight.

The schematic diagram of FIG. 9 depicts the system for providing air to the air springs 18 and to the shock absorbers. An air compressor 54 of any suitable known design provides air under pressure through a check valve 55 to a reservoir 56. Air from the reservoir is provided through appropriate air lines 53 through a control valve of a load dependent chassis height sensing means 51 both the air springs and to the shock absorbers 50 and 52. As noted above, the shock absorbers are selected tuned to provide desired damping characteristics. The air under pressure to control the valving of the hydraulic shock absorbers is tapped directly from the air supply line 53 feeding the air spring. Thus the air springs and the shock absorbers are pneumatically controlled by the same source of compressed air.

While algorithms may be developed to determine the exact operating relation between the air springs and the shocks, and the required air pressure to be provided to each component, it has been found preferable to empirically "fine tune" or adjust the shocks by actually riding the vehicle and determining the particular adjustments to be made. By feeling the ride, adjustments can be made to the air pressure and valving for the shock absorbers to provide a softer or stiffer ride under various conditions, as desired. After initial tuning of a shock absorber type on a vehicle chassis, that particular type shock absorber is selected for use for that type vehicle. Note that the tuning for or adjustment of the front shock absorbers 50 is normally different from the tuning for the rear shocks. The air pressure provided to the air spring results in a proportional air pressure being provided to valving of the shock absorbers. The valving of the shock absorber, in turn, controls the effective hydraulic forces within the shock absorber. Accordingly, the shock absorbers also dampen the vehicle axle forces directly dependent on the load.

Load adjustment is controlled by a height sensing means 51, of any suitable known type, which senses the height of the vehicle chassis relative to the rear axle. While a single height sensing means is normally sufficient, having a height sensing means on both sides of the vehicle provides more sensitive response dependent not only on the total load but also on the load distribution.

As shown if FIG. 7, the air supply system for the vehicle includes a compressor which is driven to provide air under pressure air reservoir as is well known. The air supply to is controlled by a suitable check valve. Load adjustment is supplied by a height sensing means 51, of any suitable known type, that senses the height of the vehicle chassis relative to the rear axle and provides air under pressure dependent on the height of the chassis which, in turn, is dependent on the load, all as is well known.

The shock absorbers for the vehicle are tuned or adjusted to operate within a selected load range. That is for the smaller pick-ups a shock with and internal valving to respond to "tuned to" a lower load range is selected. For the larger pick-up shock absorbers having an internal valving operable within a higher load range is selected. The mounting of the rear shock absorber is shown in FIG. 4 wherein the shock absorber is mounted by a suitable bracket 58 to the chassis and by another suitable bracket 59 to the axle housing, all as is well known. As will be appreciated the tuning or adjustment for the front shock absorbers is different from the tuning for the rear shock absorbers. As depicted in the diagram of FIG. 7, the reservoir and compressor provide air to the air springs and the shocks under the same pressure, and thus the shock absorbers and the air springs operate in conjunction with one another and both respond and are sensitive to the load on the chassis.

The present invention thus provides a number of advantages including:

a) the support and retention of the lever arm in a shiftable and rolling mode to adjust for the mounting of the air spring to provide better utilization of the air spring wherein the movement of the air spring base within the air bag is in a more straight line orientation to provide a truer load support, and b) self-adjusting shock absorbers which are controlled by the same air pressure source as provided to the air springs whereby the combination of features provides a smooth and controlled ride from a no-load to a full load condition.

While the invention has been particularly shown and described with reference to preferred embodiments thereof, it will be understood by those skilled in the art, that various changes in form and detail can be made therein without departing from the spirit and scope of the invention.

What is claimed is:

1. An air suspension system for a vehicle having a chassis and front and rear axle housings; said system comprising;

a) a lever arm having a forward end, a center section and a rear end, said lever arm being mounted on said chassis to extend transversely to, and rearwardly of said rear axle housing;

b) a pivoting assembly for mounting the rear end of said lever arm in a pivoting mode to said chassis;

c) an air spring mounted on said lever arm between said lever arm and said chassis to provide load support to said chassis;

d) a bracket assembly including a roller bushing for mounting the front end of said lever arm in a caged position while enabling a shifting arcuate movement of said lever arm relative to said bushing;

e) means for controlling the air pressure of said air spring; said air pressure controlling means being operatively coupled to said air spring which pressure is dependent on the vehicle loading;

f) a pneumatic controlled hydraulic shock absorber mounted between said chassis and said axle housing to provide load support for chassis; and g) means for concurrently supplying pressurized air to said air spring and said shock absorber;

whereby said air spring and shock absorber are adapted to be automatically sensitive and responsive to a load on the chassis.

2. An air suspension system for a vehicle having a chassis and front and rear axle housings, said system comprising:

lever arm having a forward end, a center section and a rear end, said lever arm being mounted on said chassis to extend transversely to, and rearwardly of, said rear axle housing;

means for mounting said forward end of said lever arm to be shiftably supported by said rear axle housing;

means for pivotally mounting the rear end of said lever arm to said chassis;

an air spring mounted on said center section of said lever arm between said lever arm and said chassis to provide load support to said chassis;

means for providing controlled air under pressure to said air spring which pressure is dependent on the vehicle loading;

at least one hydraulic shock absorber;

means for connecting said air pressure providing means to control said at least one shock absorber;

said at least one shock absorber and said air spring receiving approximately equal air pressure from said controlled air providing means whereby said at least one shock absorber and said air spring work in conjunction to dampen the vehicle axle forces;

a torque rod affixed to said rear axle housing and extending forward to pivotally mount on said chassis;

said torque rod confining the movement of said rear axle to a defined arcuate path;

said lever arm affecting movement of said rear axle dependent on load conditions imparted to said lever arm by said air spring;

said means for mounting said forward end of said lever arm enabling said lever arm to shift relative to said rear axle housing to enable said rear axle housing to move in an arcuate path different than the arcuate path of said lever arm whereby the load on said air spring is effected in a substantially linear manner throughout the movement of said rear axle housing.

3. An air suspension system for a vehicle having a chassis and front and rear axle housings, said system comprising:

a lever arm having a forward end, a center section and a rear end, said lever arm being mounted on said chassis to extend transversely to, and rearwardly of, said rear axle housing;

means for mounting said forward end of said lever arm to be shiftably supported by said rear axle housing;

means for pivotally mounting the rear end of said lever arm to said chassis;

an air spring mounted on said center section of said lever arm between said lever arm and said chassis to provide load support to said chassis;

a torque rod affixed to said rear axle housing and extending forward to pivotally mount on said chassis;

said torque rod confining the movement of said rear axle to a defined arcuate path;

said lever arm affecting movement of said rear axle dependent on load conditions imparted to said lever arm by said air spring;

said means for mounting said forward end of said lever arm enabling said lever arm to shift relative to said rear axle housing to enable said rear axle housing to move in an arcuate path different than the arcuate path of said lever arm whereby the load on said air spring is effected in a substantially linear manner throughout the movement of said rear axle housing;

front and rear shock absorbers, a compressor, a reservoir and a chassis height sensor for sensing the load on the vehicle;

said front shock absorbers having a first damping characteristic and said rear shock absorbers having a second damping characteristic;

and means for concurrently connecting the compressor and reservoir to supply air directly to said air spring and directly to said shock absorbers under the same pressure.

* * * * *